United States Patent [19]

Oshina et al.

[11] Patent Number: 5,203,168

[45] Date of Patent: Apr. 20, 1993

[54] HYDRAULIC DRIVING CIRCUIT WITH MOTOR DISPLACEMENT LIMITATION CONTROL

[75] Inventors: Morio Oshina, Ibaragi; Takashi Kanai, Kashiwa; Mitsuo Sonoda, Ibaragi, all of Japan

[73] Assignee: Hitachi Construction Machinery Co., Ltd., Chiyoda, Japan

[21] Appl. No.: 724,183

[22] Filed: Jul. 1, 1991

[30] Foreign Application Priority Data

Jul. 4, 1990 [JP] Japan .................. 2-177150

[51] Int. Cl.$^5$ .................. F16D 31/02; F16D 39/00
[52] U.S. Cl. .................. 60/426; 60/488; 60/490
[58] Field of Search .................. 60/487, 488, 490, 491, 60/492, 426

[56] References Cited

U.S. PATENT DOCUMENTS

| | | | |
|---|---|---|---|
| 3,054,263 | 9/1962 | Budzich et al. | 60/490 X |
| 3,595,334 | 7/1971 | Issac | 60/426 X |
| 3,986,358 | 10/1976 | Hoffmann | 60/490 X |
| 4,096,694 | 6/1978 | Habiger et al. | 60/487 X |
| 4,103,489 | 8/1978 | Fletcher et al. | |
| 4,168,612 | 9/1979 | Nikolaus | 60/488 X |
| 4,669,267 | 6/1987 | Greenhow | 60/490 |
| 4,688,380 | 8/1987 | Reinhardt et al. | 60/420 |
| 4,739,616 | 4/1988 | Myers | 60/428 X |
| 4,858,435 | 8/1989 | Ikeda | 60/490 X |

FOREIGN PATENT DOCUMENTS

| | | |
|---|---|---|
| 2342786 | 3/1975 | Fed. Rep. of Germany . |
| 2422480 | 11/1975 | Fed. Rep. of Germany ........ 60/490 |
| 1029857 | 5/1966 | United Kingdom .................. 60/490 |
| 1310351 | 3/1973 | United Kingdom .................. 60/490 |

Primary Examiner—Edward K. Look
Assistant Examiner—John Ryznic
Attorney, Agent, or Firm—Oliff & Berridge

[57] ABSTRACT

A first hydraulic circuit comprises a variable displacement hydraulic pump driven by a prime mover, a variable displacement hydraulic motor connected in a closed circuit to the variable displacement hydraulic pump, and a displacement control means for controlling a displacement of the variable displacement hydraulic motor. A second hydraulic circuit comprises a hydraulic pump driven by the prime mover, and drives a loader attachment. A displacement limitation means limits the maximum value of the displacement of the variable displacement hydraulic motor in accordance with a load pressure of the second hydraulic circuit. For example, the displacement limitation means reduces the maximum value of the displacement of the variable displacement hydraulic motor in proportion to the pressure in the second hydraulic circuit. The motor torque is controlled by directly adjusting the displacement of the motor, and a load of the hydraulic motor can thus be stably controlled.

15 Claims, 6 Drawing Sheets

FIG.9

HYDRAULIC DRIVING CIRCUIT WITH MOTOR DISPLACEMENT LIMITATION CONTROL

BACKGROUND OF THE INVENTION

1. Field of the Invention

The present invention relates to a hydraulic driving circuit in which a variable displacement hydraulic pump and a variable displacement hydraulic motor are connected in a closed circuit. More particularly, the present invention pertains to a structure which is designed such that control of travel torque during the combined operation consisting of travel and loader operations is performed by controlling the displacement of the variable displacement hydraulic motor in accordance with a load for a loader operation.

2. Description of the Related Art

Construction machines, such as a wheel loader, including a first hydraulic circuit for travelling the machine and a second hydraulic circuit for a loader attachment used for, for example, digging, are known. In such construction machines, how power is distributed for travelling and loader attachment is an essential matter. If the moving force is set too high with regard to soil pushing and tracting, the tractive force may become too large with respect to the loading force. This may cause the tires to slip when a bucket pushed into the soil is lifted, reducing the tractive force during the combined operation. Various types of circuits have been proposed to solve this problem.

Figure 6:
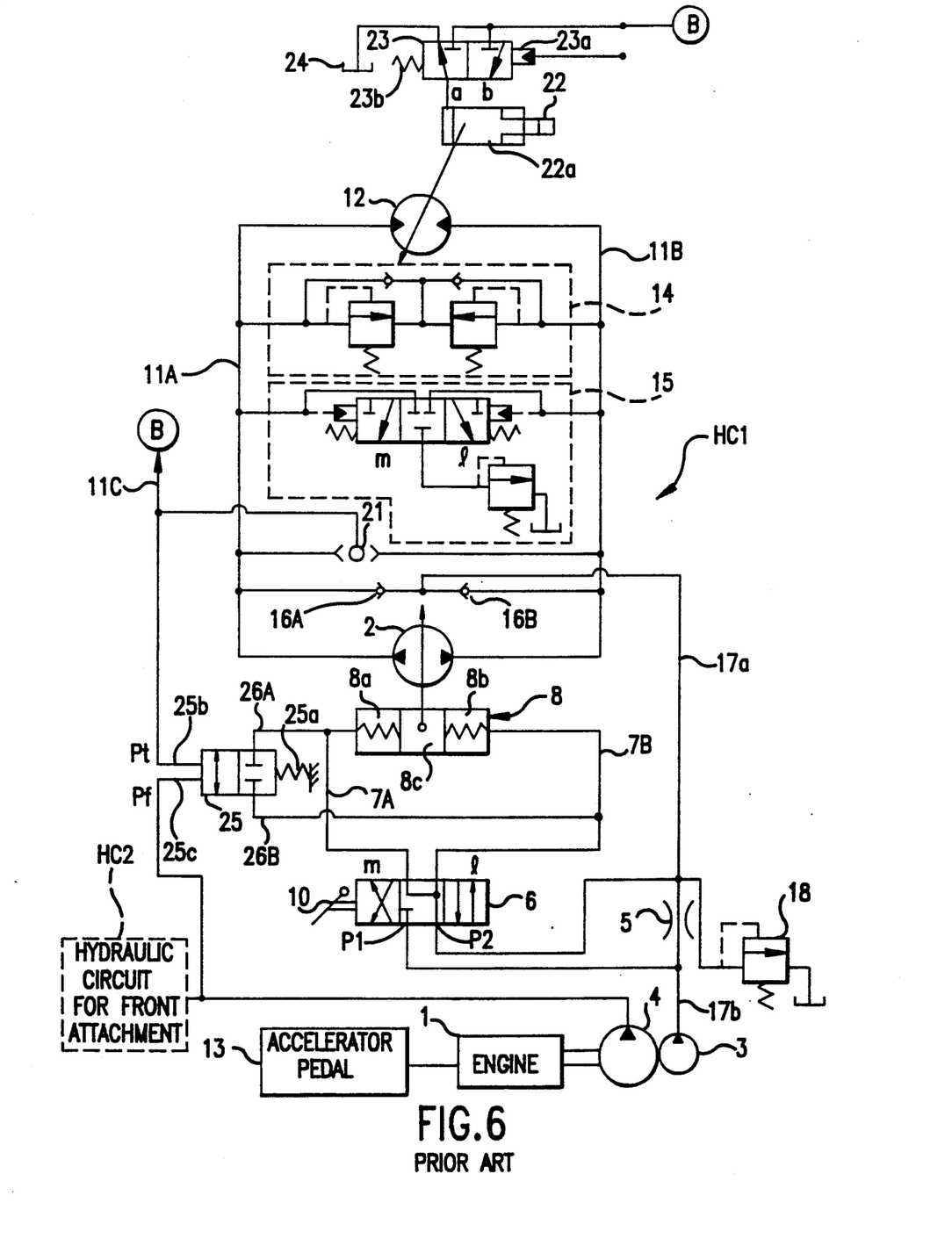
FIG. 6 shows a conventional hydraulic circuit.

FIG. 6 shows an example of the above-described type of conventional hydraulic driving circuit which has been proposed by the present inventors. In FIG. 6, a reference numeral HC1 denotes a hydraulic circuit for travelling, and HC2 denotes a hydraulic circuit for a loader operation. A variable displacement hydraulic pump 2 for travelling, a charge pump 3 and a hydraulic pump 4 for a loader operation are rotated by an engine 1, such as a Diesel engine. When a forward/reverse change-over valve 6 is set to neutral, the hydraulic oil discharged from the charge pump 3 passes through a restrictor 5 and the forward/reverse change-over valve 6 and is then led to both cylinder chambers 8a and 8b of a cylinder 8 via conduits 7A and 7B to equalize the pressure in both cylinder chambers 8a and 8b. A piston 8c is located at a neutral position, and the displacement (hereinafter also referred to as a tilting amount) of the variable displacement hydraulic pump 2 is thus zero, thereby making the discharge thereof zero.

When the forward/reverse change-over valve 6 is operated to the "l" side by an operation lever 10, the upstream pressure of the restrictor 5 is applied to the cylinder chamber 8a while the downstream pressure is applied to the cylinder chamber 8b, thus displacing the piston 8c to the right by a distance corresponding to a differential pressure between the upstream and downstream of the restrictor 5. The tilting amount of the variable displacement hydraulic pump 2 is set, and the variable displacement hydraulic pump 2 thus discharges the hydraulic oil into a main conduit 11A at a rate determined in accordance with the tilting amount thereof, rotating the variable displacement hydraulic motor 12 and thereby moving the vehicle forward. When the forward/reverse change-over valve 6 is operated to the "m" side, tilting of the variable displacement hydraulic pump 2 is set in a reverse direction. The hydraulic oil is discharged into a main conduit 11B to rotate the hydraulic motor 12 in a reverse direction.

The speed of the engine 1 is adjusted using an accelerator pedal 13. The discharge rate of the charge pump 3 is proportional to the engine speed, and the difference in the upstream and downstream pressures of the restrictor 5 increases as the engine speed increases. Therefore, the tilting amount of the variable displacement hydraulic pump 2 increases as the engine speed increases.

The driver moves the vehicle forward by pressing the accelerator pedal 13, and then forces the front portion of the vehicle which is not shown (which may be a bucket or the like and is referred to as a loader attachment) into a stack of pebbles or the like. When the bucket packed with pebbles or the like is lifted by operating a loader attachment operation control valve (not shown) to scoop up the pebbles or the like, the hydraulic pump 4 of the loader attachment is loaded. When the sum of the loads applied to the hydraulic pumps 2 and 4 exceeds the engine output, the engine speed decreases. The difference in the upstream and downstream pressures of the restrictor 5 decreases, moving the piston 8c of the cylinder 8 toward the neutral side and thereby decreasing the tilting amount of the variable displacement hydraulic pump 2. As a result, stalling of the engine is avoided, and the engine continues rotating at a speed suited to the sum of the travel and loader operation loads.

Both pressure in the circuit for travelling (pressure from the load for travelling) Pt and pressure in the circuit for a loader attachment (pressure from loader operation load) Pf act on a switching valve 25. When (Pt+Pf) exceeds the pressure Pr set by a spring 25a, the switching valve 25 is opened, causing the conduits 7A and 7B to communicate with each other through conduits 26A and 26B. The pressures in the cylinder chambers 8a and 8b of the cylinder 8 are equalized, and the tilting amount of the variable displacement hydraulic pump 2 thus starts decreasing toward the neutral position, i.e., toward zero. As a result, the pressure in the circuit for travelling Pt decreases, and the pressure in the conduit 11C for pushing switching valve 25 thus decreases. When (Pt+Pf) ≦ Pr, the switching valve 25 is switched over to the closed position, and the displacement of the variable displacement hydraulic pump 2 is thus increased, whereby increasing the discharge rate of the variable displacement hydraulic pump 2 and hence the pressure in the circuit for travelling. When (Pt+Pf) > Pr again, the switching valve 25 is switched over to the open position, and the discharge rate of the variable displacement hydraulic pump 2 thereby decreases. By repeating the above-described operation, the travelling circuit pressure is controlled to a predetermined value to control the output torque of the hydraulic motor 12.

Figure 7:
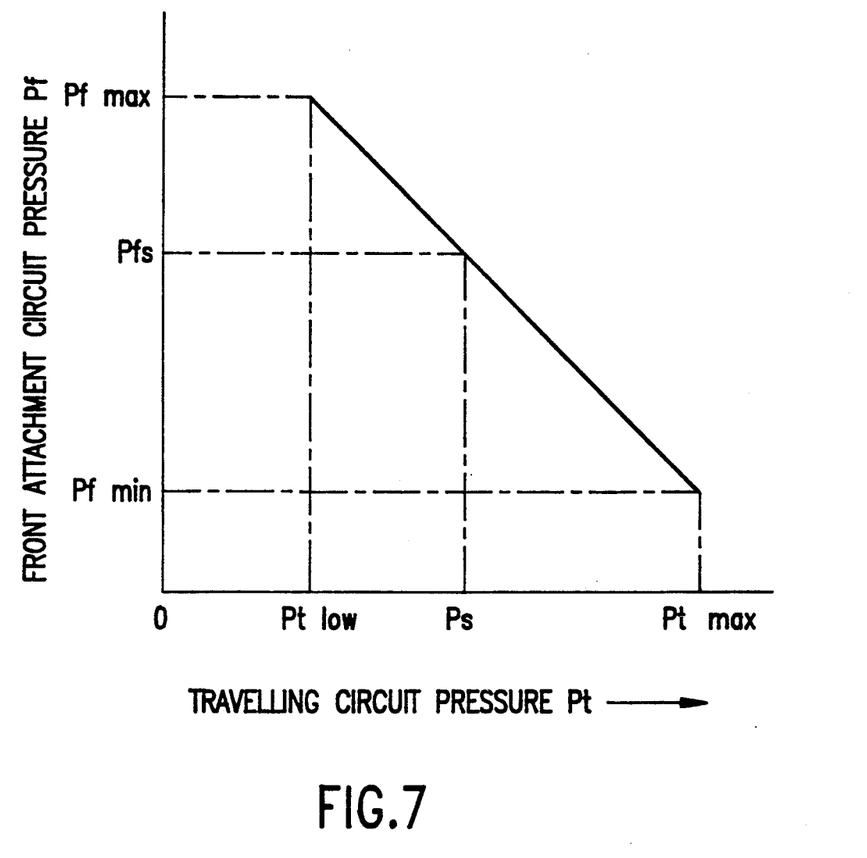
FIG. 7 shows the relationship between the pressure in the circuit for travelling and the pressure in the circuit for the loader attachment.

The above-described operation is based on the relationship between (Pt+Pf) and Pr. The relationship between the pressure in the circuit for the loader attachment and the pressure in the circuit for travelling is shown in FIG. 7. In FIG. 7, Ptmax denotes the maximum pressure in the circuit for travelling, Ps denotes the circuit pressure when the tire is slipping, Pfmax and Pfmin respectively denote the maximum pressure in the circuit for the loader attachment and the pressure when the circuit for loader attachment is not operated, Ptlow denotes the pressure in the circuit for travelling when the pressure in the circuit for the loader attachment is Pfmax. When the loader attachment is not operated, the pressure in the circuit for travelling tends to rise up to Ptmax. However, slipping of the tire occurs when the pressure in the circuit for travelling reaches a certain value. When the loader attachment is operated when the tire is slipping, the pressure in the circuit for loader attachment Pf rises while the pressure in the circuit for travelling Pt drops in accordance with the graph of FIG. 7. When the pressure in the circuit for the loader attachment is Pfs or above, the pressure in the circuit for travelling is reduced to Ps or below and the tire stops slipping.

Figure 8:
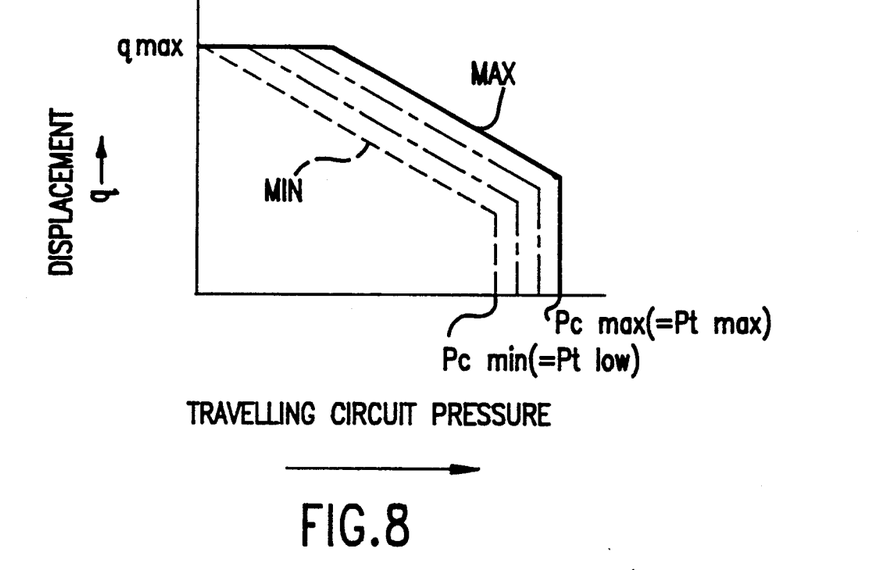
FIG. 8 is a P - q diagram.

FIG. 8 shows the P - q diagram for the hydraulic pump 2. The cut-off pressure Pc is dependent on the pressure in the circuit for the loader attachment Pf. At Pfmin, the cut-off pressure is Pcmax (=Ptmax: FIG. 7). At Pfmax, the cut off pressure is Pcmin (=Ptlow: FIG. 7). The P - q diagram is set between Max and Min in accordance with the pressure in the circuit for the loader attachment.

The tilting amount of the hydraulic motor 12 is controlled in the manner described below.

Figure 9:
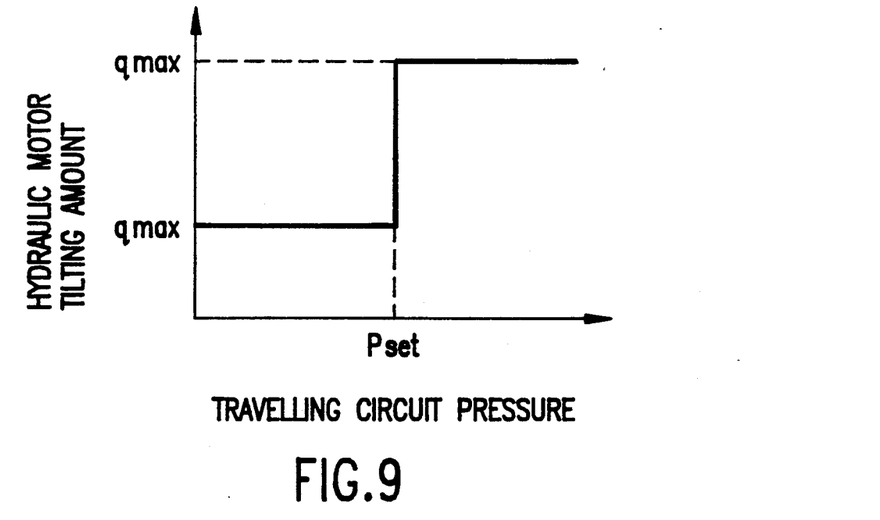
FIG. 9 is a graph showing the relationship between the pressure in the circuit for travelling and a tilting amount.

A higher pressure selecting valve 21 selects a higher one among the pressure in the conduits 11A and 11B and the selected pressure is introduced to the conduit 11C. The pressure in the conduit 11C is led to the small-diameter chamber of a tilting cylinder 22 for the hydraulic motor and to a pilot port 23a of a change-over valve 23. When the pressure in the circuit for travelling is lower than the pressure Pset set by a spring 23b of the change-over valve 23, the change-over valve 23 is located at "a" position, causing the large-diameter chamber of the tilting cylinder 22 to communicate with a tank 24. A piston 22a is moved to the left by the pressure in the circuit for travelling led into the small-diameter chamber. Thus, the tilting amount of the hydraulic motor 12 is maintain at the minimum value. When the pressure in the circuit for travelling in the conduit 11C increases to the pressure Pset set by the spring 23b or above, the change-over valve 23 is switched over to "b" position. The pressure in the circuit for travelling is also led into the large-diameter chamber of the tilting cylinder 22, and the piston 22a thereby moves to the right due to the difference in the area between the large- and small-diameter chambers. Rightward movement of the piston 22a increases the tilting amount of the hydraulic motor 12. The tilting amount of the hydraulic motor 12 is balanced to a given value between qmin and qmax shown in FIG. 9 in accordance with the load for travelling.

In FIG. 6, a reference numeral 14 denotes a cross overload relief valve; 15, a flushing valve; 16A and 16B, checking valves which are connected to the charge pump 3 through conduits 17a and 17b, and 18, a relief valve for the charging pump.

In the above-described conventional hydraulic driving circuit, when the sum of the loads for travelling and loader operation exceeds the output of the engine and the engine speed is thereby reduced, the tilting amount of the variable displacement hydraulic pump 2 is reduced in accordance with the engine speed, and the load is thereby restricted. Furthermore, torque for travelling is reduced by reducing the displacement of the variable displacement hydraulic pump as the pressure in the circuit for the loader attachment is greater.

However, the conventional hydraulic driving circuit has the following drawbacks.

(1) When the pressure in the circuit for the loader attachment exceeds a predetermined value, the tilting amount of the variable displacement hydraulic pump 2 is reduced using the cut-off control to reduce the pressure in the circuit for travelling and thereby limit the output torque of the hydraulic motor 12. Therefore, if the motor load is inertial, a slight change in the tilting amount rapidly and greatly changes the pressure. This makes stable control of the circuit pressure difficult. Furthermore, since the load changes greatly during the digging operation, it acts as a disturbance, making stable control of the circuit pressure more difficult.

(2) As the pressure which acts on two pilot pressure receiving portions 25b and 25c of the switching valve 25 is high, even when the spring 25a has a large size, each diameter of the pistons of the switching valve 25 must be made very small (generally, about 2 mm). And since the area ratio between the two pistons affects to reduce the output torque, inaccurate dimension of the pressure receiving portions varies the reduction ratio of the output torque. This results in variations in the distribution of power to the travelling and loading forces during the combined operation for each machine.

SUMMARY OF THE INVENTION

It is an object of the present invention to provide a hydraulic driving circuit in which the displacement of a variable displacement hydraulic motor is controlled directly in accordance with the load of a loader attachment during the combined operation.

The present invention is directed to a hydraulic driving circuit which comprises a first hydraulic circuit including a variable displacement hydraulic pump driven by a prime mover, a variable displacement hydraulic motor connected to the variable displacement hydraulic pump in a closed circuit, and a displacement control means for controlling a displacement of the variable displacement hydraulic motor, and a second hydraulic circuit for driving a loader attachment by the prime mover.

The hydraulic driving circuit comprises a displacement limitation means for limiting the maximum value of the displacement of the variable displacement hydraulic motor in accordance with a load pressure in the second hydraulic circuit.

The displacement of the variable displacement hydraulic motor is controlled by the load pressure in the first hydraulic circuit. The maximum value of the displacement of the variable displacement hydraulic motor is limited in accordance with the load pressure in the second hydraulic circuit by the displacement limitation means. For example, the maximum value of the displacement of the variable displacement hydraulic motor is reduced in proportion to the pressure in the second hydraulic circuit. As a result, the torque of the motor is controlled directly by adjusting the displacement, and even when the variable displacement hydraulic motor is connected to an inertial load, stable control is possible when compared with a hydraulic driving circuit in which the torque for a motor is reduced by reducing the circuit pressure which is achieved by reducing the displacement of the hydraulic pump.

The motor displacement limitation means comprises a first displacement determination means for determining the displacement of the hydraulic motor in accordance with the pressure in the first hydraulic circuit, and a second displacement determination means for determining the displacement of the hydraulic motor in accordance with the pressure in the second hydraulic circuit. The motor displacement limitation means controls the motor displacement control means such that a smaller displacement is selected as the maximum values among the displacements determined by the first and second displacement determination means.

The displacement of the hydraulic motor may be determined in accordance with the degree with which an accelerator pedal is pressed.

The motor displacement control means may be a hydraulic regulator for controlling the displacement of the hydraulic motor using a hydraulic pressure. In that case, the first displacement determination means is a hydraulic pressure change-over valve for controlling the hydraulic pressure input to the hydraulic regulator such that the displacement corresponding to the pressure in the first hydraulic circuit is obtained. The second displacement determination means is a hydraulic pressure change-over valve for controlling the hydraulic pressure input to the hydraulic regulator such that the displacement corresponding to the pressure in the second hydraulic pressure is obtained. These two hydraulic pressure change-over valves are disposed such that the hydraulic pressure of the hydraulic pressure change-over valve actuated to reduce the displacement is input to the hydraulic regulator prior to the other one.

The motor displacement control means may be an electric regulator for controlling the displacement of the hydraulic motor using an electric signal. In that case, the first displacement determination means is a first function generator for outputting as an electric signal the displacement corresponding to the pressure in the first hydraulic circuit or to the degree with which an accelerator pedal is pressed. The second displacement determination means is a second function generator for outputting as an electric signal the displacement corresponding to the pressure in the second hydraulic circuit. The motor displacement limitation means further is a minimum value selection means for selecting the minimum value of the signals output from the first and second function generators.

The second function generator may be replaced by a coefficient generator for outputting as an electric signal the coefficient corresponding to the pressure in the second hydraulic circuit. In that case, the coefficient generator is a switch which is closed and thereby generates the coefficient signal when the pressure in the first hydraulic circuit exceeds a predetermined value, and a multiplier for outputting the product of the output of the switch and the signal output from the function generator to the electric regulator.

The first hydraulic circuit includes a bidirectional tilting type variable displacement hydraulic pump driven by a prime mover, a pilot pump rotated by the primer mover, a restrictor for generating a differential pressure corresponding to a discharge of the pilot pump, a pump displacement control means for controlling a displacement of the variable displacement hydraulic pump in accordance with the differential pressure generated by the restrictor, a forward/reverse change-over valve for controlling the direction of discharge of the variable displacement hydraulic pump by changing over the direction in which the pressure difference input to the pump displacement control means acts, a variable displacement hydraulic motor connected to the variable displacement hydraulic pump in a closed circuit, and a motor displacement control means for controlling a displacement of the variable displacement hydraulic motor. The speed of the prime mover is controlled by means of an accelerator pedal.

DETAILED DESCRIPTION OF THE PREFERRED EMBODIMENTS

First Embodiment

Figure 1:
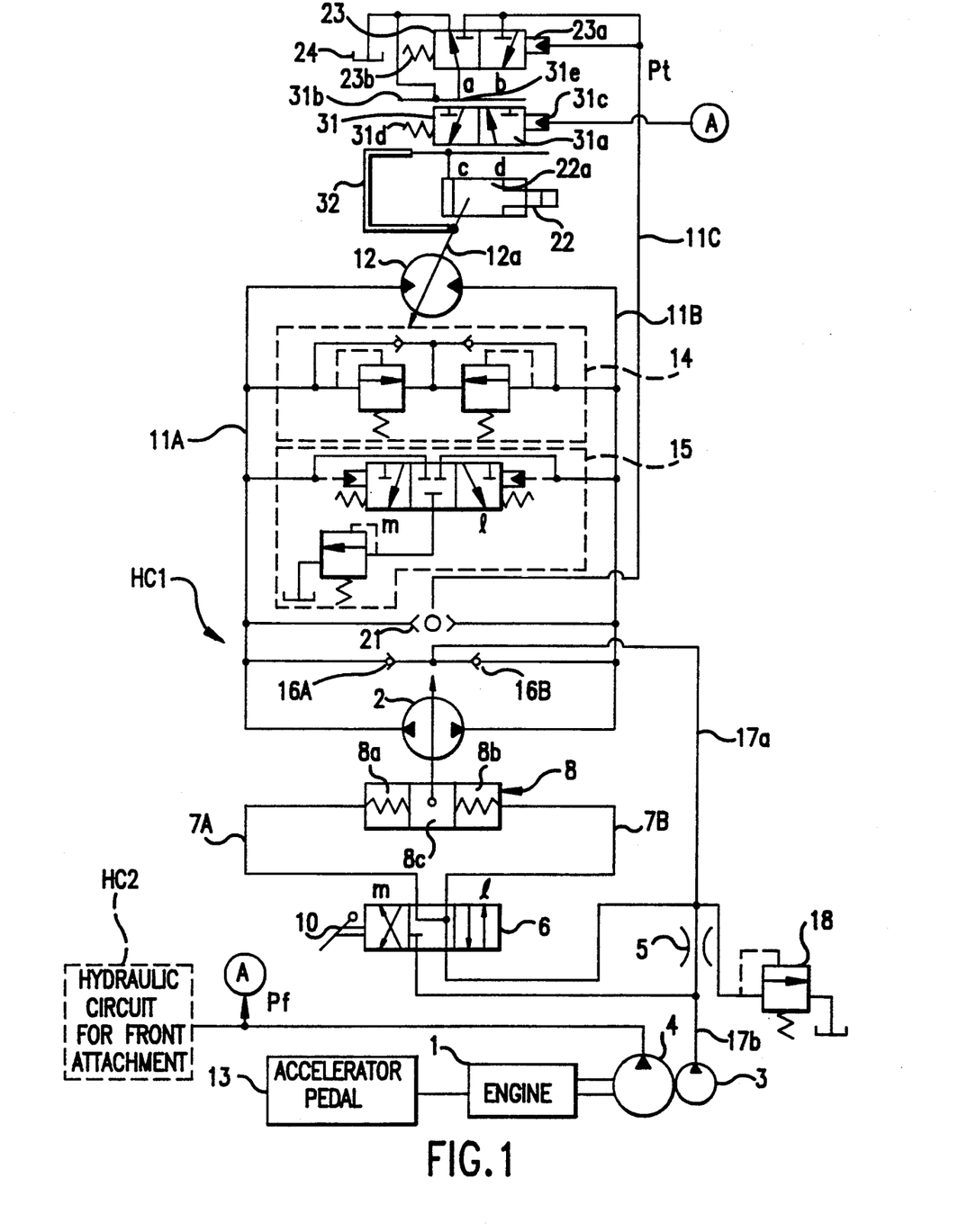
FIG. 1 is a hydraulic circuit diagram of a first embodiment of the present invention.

FIG. 1 shows a first embodiment of a hydraulic driving circuit for performing a combined operation of travel and loader operation. In FIG. 1, the same reference numerals are used to denote parts which are the same as those shown in FIG. 6. The following discussion focuses on the differences between the two hydraulic driving circuits.

The switching valve 25 driven by the sum of the travelling circuit pressure Pt and the front attachment circuit pressure Pf is omitted, and a servo valve 31 is interposed between the change-over valve 23 and the tilting cylinder 22. The servo valve 31 includes a spool 31a, and a sleeve 31b fitted on the spool 31a. The pressure in the hydraulic pump 4 is led to a pilot port 31c of the servo valve 31 as the pressure in the circuit for the loader attachment. The sleeve 31b is coupled to a tilting amount control level 12a of the hydraulic motor 12 through a servo lever 32. When the pressure in the circuit for the loader attachment is lower than the value determined by a spring 31d of the servo valve 31, the servo valve 31 is in a position indicated by "c" in FIG. 1. Even when the tilting amount of the hydraulic motor 12 has increased to the maximum value and the sleeve 31b dependent on the position of the tilting amount control lever 12a is thereby located to the rightmost position, the servo valve 31 is maintained to the position indicated by "c".

When the sum of the load for travelling and loader operation exceeds the output of the engine during the combined operation of travel and loader operation while the accelerator pedal 13 is pressed, the speed of the engine 1 is reduced, thus reducing the tilting amount of the hydraulic pump 2 for travelling. This is the same as that of the conventional hydraulic driving circuit.

When the front attachment circuit pressure is lower than the value determined by the spring 31d of the servo valve 31, the servo valve 31 is changed over to the position indicated by "c" regardless of the position of the tilting amount controlling lever 12a. Therefore, the tilting amount of the hydraulic motor 12 is controlled in accordance with the pressure in the circuit for travelling in the same manner as that for the conventional hydraulic driving circuit, and is increased up to the maximum tilting amount qmax. The maximum output torque Tmax of the hydraulic motor 12 at the maximum tilting amount qmax is expressed by the following equation.

$$T_{max} = q_{max} \cdot \Delta P_{max}$$

where the maximum pressure ΔPmax is the maximum value of the differential pressure between the conduits 11A and 11B, which is the difference between the pressure set in the relief valve 14 and the pressure set in the relief valve 18 for the charging system.

During the combined operation, both the pressure in the circuit for travelling Pt and the pressure in the circuit for the loader attachment Pf are generated, and the tilting amount of the hydraulic motor 12 is controlled in the following manner.

Assuming that the pressure in the circuit for the loader attachment is zero and the tilting amount of the hydraulic motor 12 is at its maximum valve qmax due to the pressure in the circuit for travelling, the change-over valve 23 is switched over to the position indicated by "b". The spool 31a of the servo valve 31 is located at the rightmost position by the spring 31d, and the sleeve 31b is also located at the rightmost position. The servo valve 31 is therefore switched over to the position indicated by "c".

When the front attachment circuit pressure rises in that state, the spool 31a of the servo valve 31 moves to the left in accordance with the pressure in the circuit for the loader attachment, and the large-diameter chamber of the tilting cylinder 22 thereby communicates with the tank 24 through the servo valve changed over to the position indicated by "d". The piston 22a of the tilting cylinder 22 moves to the left due to the pressure in the small-diameter chamber, and the tilting amount of the hydraulic motor 12 is thereby reduced. The movement of the tilting control lever 12a is fed back to the sleeve 31b by the servo lever 32, and moves the sleeve 31b to the left and to the position indicated by "c" with respect to the spool 31a. The pressure in the conduit 11C is led again to the large-diameter chamber of the tilting cylinder 22 through the change-over valve 23, moving the piston 22a to the right and thereby increasing the tilting amount of the hydraulic motor 12. Thus, the tilting amount of the hydraulic motor 12 is set to the position corresponding to the pressure in the circuit for the loader attachment by repeating the abovedescribed operations. That is, the maximum tilting amount of the variable displacement hydraulic motor 12 is reduced in proportion to the pressure in the circuit for the loader attachment. When the pressure in the circuit for the loader attachment is at a rated value, it is preferred that the tilting amount of the hydraulic motor 12 is reduced within a value from 50 to 70% of its maximum value.

When the loader attachment is operated at a rated pressure, the output torque of the hydraulic motor 12 is limited within a value from 50 to 70% of the maximum torque, and slipping of tires is inevitably avoided. To achieve this torque restriction in the prior art, the output torque of the hydraulic motor 12 is reduced by controlling the displacement of the hydraulic pump 2 in accordance with the load of the loader attachment and thereby reducing the pressure in the circuit for travelling. However, in this embodiment, torque restriction is achieved by reducing the tilting amount of the hydraulic motor 12 directly in accordance with the pressure in the circuit for a loader attachment. Therefore, stable control of the inertial load is made possible by the hydraulic motor.

The change-over valve 23 may be omitted so that the pressure in the conduit 11C can be directly input to the port 31e of the servo valve 31. In that case, while the pressure in the circuit for the loader attachment is low, the tilting amount of the variable displacement hydraulic motor 12 is fixed to qmax. And as the pressure in the circuit for the loader attachment rises, the tilting amount of the motor 12 decreases.

Second Embodiment

Figure 2:
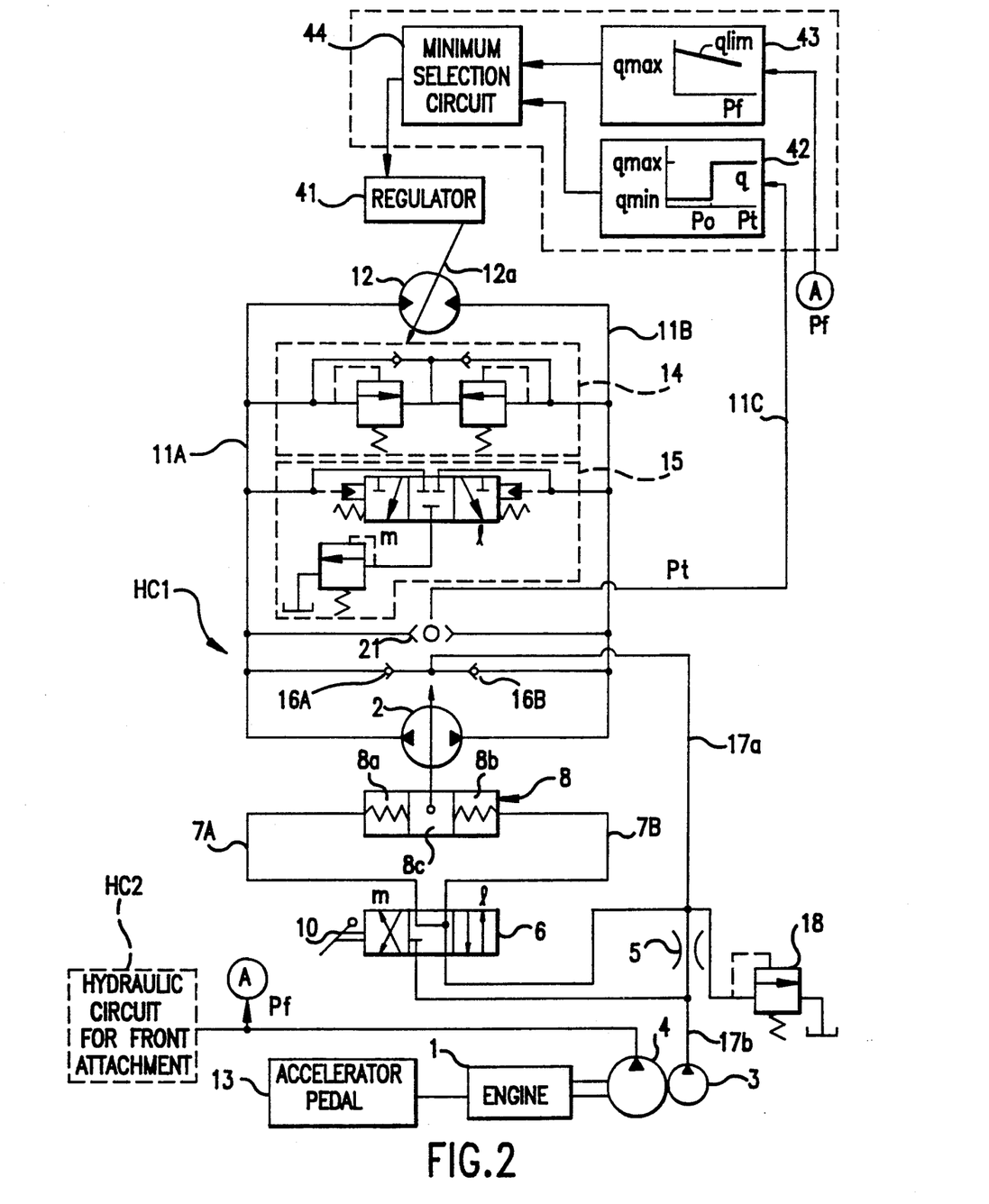
FIG. 2 is a hydraulic circuit diagram of a second embodiment of the present invention.

FIG. 2 shows a second embodiment of the present invention. In FIG. 2, the same reference numerals are used to denote components which are the same as those shown in FIGS. 1 and 6.

This embodiment employs an electric type regulator for regulating the variable displacement hydraulic motor 12. A reference numeral 41 denotes an electric type regulator for driving the tilting amount controlling lever 12a in accordance with an electric signal input thereto; 42, a function generator for setting the tilting amount q to a value within a range from qmin to qmax in accordance with the pressure Pt in the conduit 11C; and 43, a function generator for limiting the maximum tilting amount of the hydraulic motor 12 to a limited tilting amount qlim. The function generator limits the maximum tilting amount within a value from 50 to 70% of qmax when the pressure in the circuit for the loader attachment Pf is at a rated value. The outputs of the function generators 42 and 43 are input to a minimum value selecting circuit 44 which supplies the smaller tilting amount to the regulator 41.

When the pressure in the circuit for the loader attachment is zero and the pressure in the circuit for travelling Pt is at a predetermined value Po or less, the tilting amount of the variable displacement hydraulic motor 12 is controlled to qmin. When the pressure in the circuit for the loader attachment is zero and the pressure in the circuit for travelling Pt exceeds a predetermined value Po, the tilting amount of the variable displacement hydraulic motor 12 is set to a predetermined value within a range from qmin to qmax. When the pressure in the circuit for the loader attachment Pf is generated, the minimum value selecting circuit 44 selects the smaller tilting amount from among the tilting amount q set by the pressure in the circuit for travelling Pt and the limited tilting amount qlim set by the pressure in the circuit for the loader attachment Pf, and inputs the selected tilting amount to the regulator 41 which controls the tilting amount of the hydraulic motor 12. Therefore, the same effect as that of the first embodiment can be achieved.

The function generator 42 may be omitted. In that case, when the pressure in the circuit for the loader attachment is low, the tilting amount of the hydraulic motor 12 will be fixed to qmax. And when the pressure in the circuit for the loader attachment rises thereafter, the tilting amount will be reduced.

Figure 3:
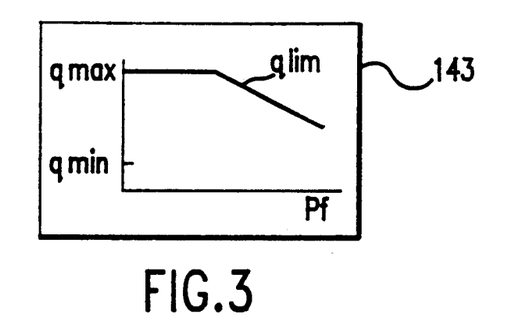
FIG. 3 shows a modification of a function generator.

As will be seen from a function generator 143 shown in FIG. 3, when the pressure in the circuit for the loader attachment Pf is low, the limited tilting amount qlim may be fixed to qmax so that no limitation of the tilting amount of the hydraulic motor 12 is set essentially. In this way, when the load of the load attachment is low, e.g., when the arm is lifted during the transport operation, unnecessary reduction in the travelling force is avoided.

Figure 4:
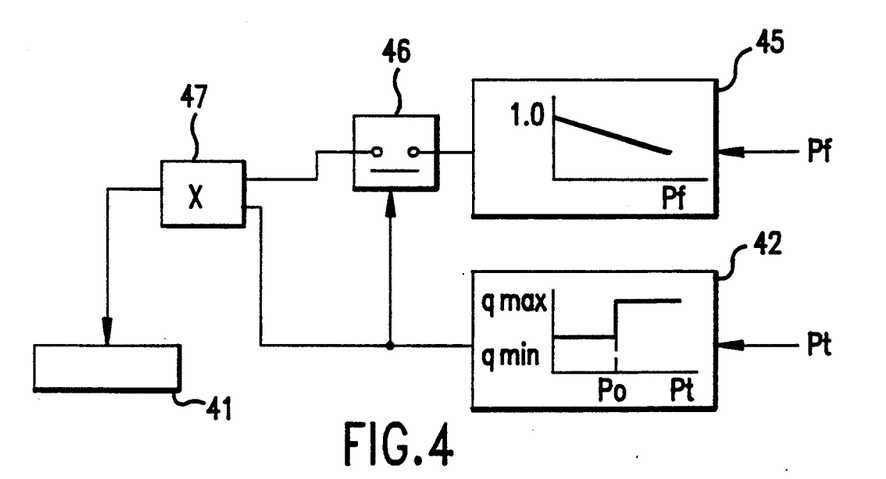
FIG. 4 shows a modification of the second embodiment.

FIG. 4 shows another method of controlling the electric regulator 41.

In FIG. 4, a reference numeral 45 denotes a function generator (coefficient generator) for limiting the maximum tilting amount qmax of the hydraulic motor 12 in accordance with the discharge pressure Pf of the hydraulic pump 4 for the loader operation. The function generator 45 outputs a coefficient 1.0 when the pressure in the circuit for the loader attachment Pf is 1 and a coefficient 0.5 to 0.7 when the pressure in the circuit for the loader attachment Pf is at a rated value. A switch 46 is closed by the output of the function generator 42 when the pressure Pt in the conduit 11C exceeds Po, and thereby connects the output of the function generator 45 to a multiplier 47 which multiplies it by the output of the function generator 42. The product of the multiplication is input to the regulator 41 which controls the tilting amount of the variable displacement hydraulic motor 12.

Therefore, when the pressure Pt in the conduit 11C is Po or less, the tilting amount of the hydraulic motor 12 is controlled to the value set by the function generator 42. When the pressure Pt in the conduit 11C exceeds Po, the tilting amount set by the function generator 42 is multiplied by the coefficient set by the function generator 45 by means of the multiplier 47, and the tilting amount of the hydraulic motor 12 is limited by the output of the function generator 45, i.e., by the pressure in the circuit for the loader attachment. Therefore, the same effect as that of the previous embodiments can be achieved in this embodiment.

Figure 5:
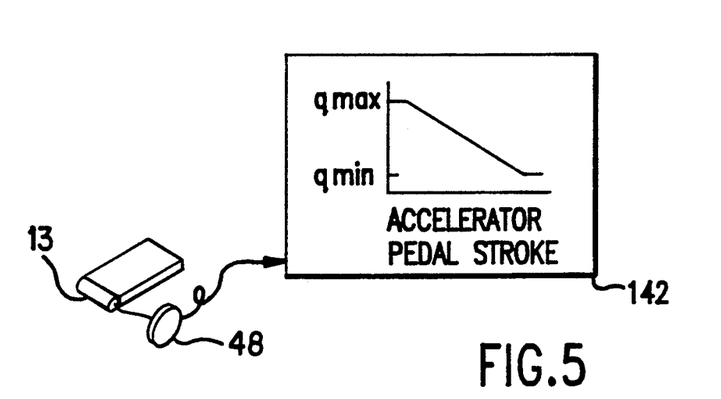
FIG. 5 shows another modification of the function generator.

Although the function generator 42 shown in FIGS. 2 and 3 outputs the tilting amount corresponding to the pressure in the circuit for travelling, it may also be arranged, shown in FIG. 5, such that it outputs a tilting amount corresponding to the degree of pressing of the accelerator pedal 13 detected by a potentiometer 48. This arrangement is used to obtain the speed corresponding to the instruction from the accelerator pedal.

The hydraulic driving circuit can be applied not only to a construction machine, such as a wheel loader, but also to various types of industrial vehicles.

What is claimed is:

1. A hydraulic driving circuit comprising:
a first hydraulic circuit having a variable displacement hydraulic pump driven by a prime mover, a variable displacement hydraulic motor connected to said variable displacement hydraulic pump in a closed circuit, and a motor displacement control means for controlling a displacement of said variable displacement hydraulic motor; and
a second hydraulic circuit for driving a loader attachment, said second hydraulic circuit including at least a hydraulic pump which is driven by said prime mover and is adopted to deliver hydraulic fluid having a load pressure which depends on a load of said loader attachment, wherein said hydraulic driving circuit comprises a motor displacement limitation means for limiting a maximum value of the displacement of said variable displacement hydraulic motor in accordance with said load pressure in said second hydraulic circuit.

2. A hydraulic driving circuit according to claim 1, wherein said motor displacement limitation means controls said motor displacement control means such that a smaller displacement is selected as said maximum value from among the displacement of said hydraulic motor determined in accordance with a pressure in said first hydraulic circuit and the displacement of said hydraulic motor determined in accordance with a pressure in said second hydraulic circuit.

3. A hydraulic driving circuit according to claim 2, wherein said motor displacement limitation means comprises a first displacement determination means for determining the displacement of said hydraulic motor in accordance with the pressure in said first hydraulic circuit, and a second displacement determination means for determining the displacement of said hydraulic motor in accordance with the pressure in said second hydraulic circuit, whereby said motor displacement limitation means controlling said motor displacement control means such that a smaller displacement is selected as said maximum value among the displacements determined by said first and second displacement determination means.

4. A hydraulic driving circuit according to claim 3, wherein said motor displacement control means comprises a hydraulic regulator for controlling the displacement of said hydraulic motor using a hydraulic pressure, wherein said first displacement determination means is a hydraulic pressure change-over valve for controlling the hydraulic pressure input to said hydraulic regulator such that the displacement corresponding to the pressure in said first hydraulic circuit is obtained, and wherein said second displacement determination means is a hydraulic pressure change-over valve for controlling the hydraulic pressure input to said hydraulic regulator such that the displacement corresponding to the pressure in said second hydraulic pressure is obtained, whereby said hydraulic pressure change-over valves which respectively consist said first and second displacement determination means being disposed such that the hydraulic pressure of the hydraulic pressure change-over valve actuated to reduce the displacement is input to said hydraulic regulator prior to the other one.

5. A hydraulic driving circuit according to claim 3, wherein said motor displacement control means comprises an electric regulator for controlling the displacement of said hydraulic motor using an electric signal, wherein said first displacement determination means is a first function generator for outputting as an electric signal the displacement corresponding to the pressure in said first hydraulic circuit, wherein said second displacement determination means is a second function generator for outputting as an electric signal the displacement corresponding to the pressure in said second hydraulic circuit, and wherein said motor displacement limitation means further comprises a minimum value selection means for selecting a minimum value of the signals output from said first and second function generators.

6. A hydraulic driving circuit according to claim 2, wherein the displacement of said hydraulic motor determined in accordance with the pressure in said second hydraulic circuit is fixed until the pressure in said second hydraulic circuit reaches a predetermined value regardless of the pressure, said displacement being reduced in accordance with the pressure in said second hydraulic circuit after the pressure exceeds said predetermined value.

7. A hydraulic driving circuit according to claim 1, wherein said motor displacement limitation means controls said motor displacement control means such that a smaller displacement is selected as said maximum value from among the displacement of said hydraulic motor determined in accordance with a degree with which an accelerator pedal is pressed and the displacement of said hydraulic motor determined in accordance with a pressure in said second hydraulic circuit.

8. A hydraulic driving circuit according to claim 7, wherein said motor displacement control means comprises an electric regulator for controlling the displacement of said hydraulic motor using an electric signal, wherein said first displacement determination means is a first function generator for outputting as an electric signal the displacement corresponding to a degree with which the accelerator pedal is pressed, wherein said second displacement determination means is a second function generator for outputting as an electric signal the displacement corresponding to the pressure in said second hydraulic circuit, and wherein said motor displacement limitation means further comprises a minimum value selection means for selecting a minimum value of the signals output from said first and second function generators.

9. A hydraulic driving circuit according to claim 1, wherein said motor displacement control means comprises an electric regulator for controlling the displacement of said hydraulic motor using an electric signal, and wherein said motor displacement limitation means comprises a function generator for outputting as an electric signal the displacement corresponding to the pressure in said first hydraulic circuit, a coefficient generator for outputting as an electric signal the coefficient corresponding to the pressure in said second hydraulic circuit, a switch which is closed when the pressure in said first hydraulic circuit exceeds a predetermined value and outputs said electric coefficient signal, and a multiplier for outputting a product of the output of said switch and the signal output from said function generator to said electric regulator.

10. A hydraulic driving circuit according to claim 1, wherein said motor displacement control means comprises an electric regulator for controlling the displacement of said hydraulic motor using an electric signal, and said motor displacement limitation means comprises a function generator for outputting an electric signal representing the displacement corresponding to the amount of depression of an accelerator pedal, a coefficient generator for outputting an electric signal representing the coefficient corresponding to the pressure in said second hydraulic circuit, a switch which is closed when the pressure in said first hydraulic circuit exceeds a predetermined value and outputs said electric coefficient signal, and a multiplier for outputting a product of the output of said switch and the signal output from said function generator to said electric regulator.

11. A hydraulic driving circuit comprising:
a first hydraulic circuit including a bidirectional tilting type variable displacement hydraulic pump driven by a primer mover, a pilot pump rotated by the prime mover, a restrictor for generating a differential pressure corresponding to a discharge of said pilot pump, a pump displacement control means for controlling a displacement of said variable displacement hydraulic pump in accordance with the differential pressure generated by said restrictor, a forward/reverse change-over valve for controlling the direction of discharge of said variable displacement hydraulic pump by changing over the direction in which the differential pressure input to said pump displacement control means acts, a variable displacement hydraulic motor connected to said variable displacement hydraulic pump in a closed circuit, and a motor displacement control means for controlling a displacement of said variable displacement hydraulic motor;
a second hydraulic circuit for driving a loader attachment using a discharge pressure of a loader attachment hydraulic pump driven by said prime mover;
an accelerator pedal for controlling a speed of said prime mover; and
a motor displacement limitation means for limiting a maximum value of the displacement of said variable displacement hydraulic motor in accordance with a load pressure in said second hydraulic circuit.

12. A hydraulic driving circuit according to claim 11, wherein said motor displacement limitation means controls said motor displacement control means such that a smaller displacement is selected as said maximum value from among the displacement of said hydraulic motor determined in accordance with the pressure in said first hydraulic circuit and the displacement of said hydraulic motor determined in accordance with the pressure in said second hydraulic circuit.

13. A hydraulic driving circuit according to claim 11, wherein said motor displacement limitation means controls said motor displacement control means such that a smaller displacement is selected as said maximum value from among the displacement of said hydraulic motor determined in accordance with a degree with which an accelerator pedal is pressed and the displacement of said hydraulic motor determined in accordance with a pressure in said second hydraulic circuit.

14. A hydraulic driving circuit according to claim 11, wherein said motor displacement control means comprises an electric regulator for controlling the displacement of said hydraulic motor using an electric signal, and wherein said motor displacement limitation means comprises a function generator for outputting as an electric signal the displacement corresponding to the pressure in said first hydraulic circuit, a coefficient generator for outputting as an electric signal the coefficient corresponding to the pressure in said second hydraulic circuit, a switch which is closed when the pressure in said first hydraulic circuit exceeds a predetermined value and outputs said electric coefficient signal, and a multiplier for outputting a product of the output of said switch and the signal output from said function generator to said electric regulator.

15. A hydraulic driving circuit according to claim 11, wherein said motor displacement control means comprises an electric regulator for controlling the displacement of said hydraulic motor using an electric signal, and wherein said motor displacement limitation means comprises a function generator for outputting as an electric signal the displacement corresponding to the degree with which an accelerator pedal is pressed, a coefficient generator for outputting as an electric signal the coefficient corresponding to the pressure in said second hydraulic circuit, a switch which is closed when the pressure in said first hydraulic circuit exceeds a predetermined value and outputs said electric coefficient signal, and a multiplier for outputting a product of the output of said switch and the signal output from said function generator to said electric regulator.

* * * * *